(12) United States Patent
Sugimoto (10) Patent No.: US 11,608,801 B2
(45) Date of Patent: Mar. 21, 2023

(54) ENGINE CONTROL DEVICE

(71) Applicant: TOYOTA JIDOSHA KABUSHIKI KAISHA, Toyota (JP)

(72) Inventor: Hitoki Sugimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/536,748

(22) Filed: Nov. 29, 2021

(65) Prior Publication Data

US 2022/0213853 A1 Jul. 7, 2022

(30) Foreign Application Priority Data

Jan. 7, 2021 (JP) .............................. JP2021-001536

(51) Int. Cl.
| | |
|---|---|
| *F02M 26/49* | (2016.01) |
| *F01N 11/00* | (2006.01) |
| *F02M 35/10* | (2006.01) |
| *F01N 3/021* | (2006.01) |

(52) U.S. Cl.
CPC ............. *F02M 26/49* (2016.02); *F01N 3/021* (2013.01); *F01N 11/00* (2013.01); *F02M 35/10373* (2013.01)

(58) Field of Classification Search
CPC .. F02M 26/49; F02M 35/10373; F01N 3/021; F01N 11/00
See application file for complete search history.

(56) References Cited

U.S. PATENT DOCUMENTS

| | | | | |
|---|---|---|---|---|
| 2011/0048001 | A1* | 3/2011 | Nagae | F01N 3/0235 60/605.2 |
| 2018/0163643 | A1* | 6/2018 | Kim | F02D 41/0055 |
| 2019/0024565 | A1* | 1/2019 | Bökelund | F01N 11/00 |
| 2019/0381996 | A1* | 12/2019 | Kaneko | B60W 20/00 |
| 2022/0082045 | A1* | 3/2022 | Townson | F01N 11/007 |

FOREIGN PATENT DOCUMENTS

JP 2010-180723 A 8/2010

\* cited by examiner

*Primary Examiner* — Brandon D Lee
(74) *Attorney, Agent, or Firm* — Finnegan, Henderson, Farabow, Garrett & Dunner, LLP (57) ABSTRACT

Upon a predetermined first diagnosis execution condition being met, an electronic control unit executes a first diagnosis process of diagnosing whether an exhaust gas recirculation device has an abnormality based on an amount of change that a measured value of an intake air pressure undergoes as a result of a change in an EGR valve position. When a predetermined second diagnosis execution condition is met and, moreover, the first diagnosis process is not being executed, the electronic control unit executes a second diagnosis process of diagnosing whether an exhaust gas cleaning filter has a fracture based on measured values of an incoming gas temperature and an outgoing gas temperature.

4 Claims, 4 Drawing Sheets

ENGINE CONTROL DEVICE

CROSS-REFERENCE TO RELATED APPLICATION

This application claims priority to Japanese Patent Application No. 2021-001536 filed on Jan. 7, 2021, incorporated herein by reference in its entirety.

BACKGROUND

1. Technical Field

The present disclosure relates to an engine control device configured to perform a failure diagnosis of an exhaust gas cleaning filter that collects fine particulate matter etc. in exhaust gas, and a failure diagnosis of an exhaust gas recirculation device that recirculates part of the exhaust gas back to an intake air passage.

2. Description of Related Art

Among devices applied to an engine, an exhaust gas recirculation (EGR) device recirculates part of exhaust gas back to an intake air passage. The EGR device includes an EGR passage connecting an exhaust gas passage and the intake air passage to each other, and an EGR valve installed in the EGR passage. The EGR valve changes a flow passage area of the exhaust gas recirculated back to the intake air passage through the EGR passage, or so-called EGR gas, as the valve position is changed. An EGR system recirculates the exhaust gas back to the intake air passage using a differential pressure between the exhaust gas passage and the intake air passage.

The device described in Japanese Unexamined Patent Application Publication No. 2010-180723 is known as an engine control device that performs an abnormality diagnosis of such an EGR device. In the engine control device described in this literature, during execution of fuel cut-off, an intake air pressure is measured with the EGR valve fully closed, and then the intake air pressure is measured again with the EGR valve opened to a predetermined position. Whether the EGR system has an abnormality is diagnosed from the result of comparing these measured values of the intake air pressure.

SUMMARY

Some engines mounted in vehicles and the like are equipped with an exhaust gas cleaning filter that collects fine particulate matter etc. in exhaust gas. This exhaust gas cleaning filter can fracture due to an outer shock or a thermal shock. Then, as the exhaust gas evades the filter by passing through the fractured portion, the function of collecting fine particulate matter etc. decreases. It is therefore desirable to also diagnose whether the exhaust gas cleaning filter has a fracture. As a method of diagnosing whether an exhaust gas cleaning filter has a fracture, the present inventor has proposed a method of making the diagnosis using measured values of the temperature and the pressure of exhaust gas upstream and downstream of the filter.

Meanwhile, the above-described abnormality diagnosis of the EGR device involves changing the position of the EGR valve. When the amount of recirculating exhaust gas changes due to a change in the position of the EGR valve, the state of the exhaust gas flowing into the exhaust gas cleaning filter changes. Therefore, if the abnormality diagnosis of the EGR device and the diagnosis of whether the exhaust gas cleaning filter has a fracture are performed at the same time, the diagnostic accuracy of the latter may decrease.

An engine control device that solves this problem is applied to an engine including an exhaust gas cleaning filter that is provided in an exhaust gas passage and an exhaust gas recirculation device that recirculates part of exhaust gas flowing through the exhaust gas passage back to an intake air passage. The exhaust gas recirculation device includes an exhaust gas recirculation passage that is a passage for the exhaust gas recirculated back to the intake air passage, and an exhaust gas recirculation valve that changes an exhaust gas flow passage area of the exhaust gas recirculation passage as the position of the valve is changed. Upon a predetermined first diagnosis execution condition being met, the engine control device executes a first diagnosis process of changing the position of the exhaust gas recirculation valve and diagnosing whether the exhaust gas recirculation device has an abnormality based on a measured value of a state quantity of intake air before the change in the valve position and a measured value of the state quantity of the intake air after the change in the valve position. Upon a predetermined second diagnosis execution condition being met, the engine control device executes a second diagnosis process of diagnosing whether the exhaust gas cleaning filter has a fracture based on a measured value of a state quantity of exhaust gas flowing into the exhaust gas cleaning filter and a measured value of the state quantity of exhaust gas flowing out of the exhaust gas cleaning filter. The engine control device does not execute the first diagnosis process and the second diagnosis process at the same time.

In the first diagnosis process, when the position of the exhaust gas recirculation valve is changed, the state of the exhaust gas flowing into the exhaust gas cleaning filter changes. Therefore, if the position of the exhaust gas recirculation valve is changed in the first diagnosis process during execution of the second diagnosis process, the accuracy of diagnosing whether the exhaust gas cleaning filter has a fracture based on measured values of the state quantity of the exhaust gas in the second diagnosis process may decrease. From this perspective, the engine control device does not execute the first diagnosis process and the second diagnosis process at the same time, even when both the first diagnosis execution condition and the second diagnosis execution condition are met. This can prevent a situation where the accuracy of diagnosing whether the exhaust gas cleaning filter has a fracture decreases as the position of the exhaust gas recirculation valve is changed to diagnose whether the exhaust gas recirculation device has an abnormality.

For the second diagnosis process based on the state quantity of the exhaust gas, compared with the first diagnosis process based on the state quantity of the intake air, there are limited opportunities to make a diagnosis that allow for high-accuracy diagnosis. It is therefore desirable that when both the first diagnosis execution condition and the second diagnosis execution condition are met, the engine control device defer execution of the first diagnosis process and execute the second diagnosis process. Further, when execution of the first diagnosis process is deferred and the second diagnosis process is executed, the first diagnosis process may be executed after the second diagnosis process ends.

When the engine has stopped combustion and, moreover, rotation of the engine is maintained as during execution of fuel cut-off control, the states of the intake air and the exhaust gas are stable, which increases the diagnostic accuracy in the first diagnosis process and the second diagnosis process. It is therefore desirable that for each of the first diagnosis execution condition and the second diagnosis execution condition, meeting the condition require that the engine has stopped combustion and that, moreover, rotation of the engine is maintained.

To diagnose whether the exhaust gas cleaning filter has a fracture in the second diagnosis process, the temperature of the exhaust gas can be used as the state quantity of the exhaust gas. Further, in that case, the second diagnosis process may diagnose whether the exhaust gas cleaning filter has a fracture based on a difference between an amount of change in the temperature of the exhaust gas flowing into the exhaust gas cleaning filter and an amount of change in the temperature of the exhaust gas flowing out of the exhaust gas cleaning filter.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

One embodiment of an engine control device will be described in detail below with reference to FIG. 1 to FIG. 5.

Configuration of Engine

Figure 1:
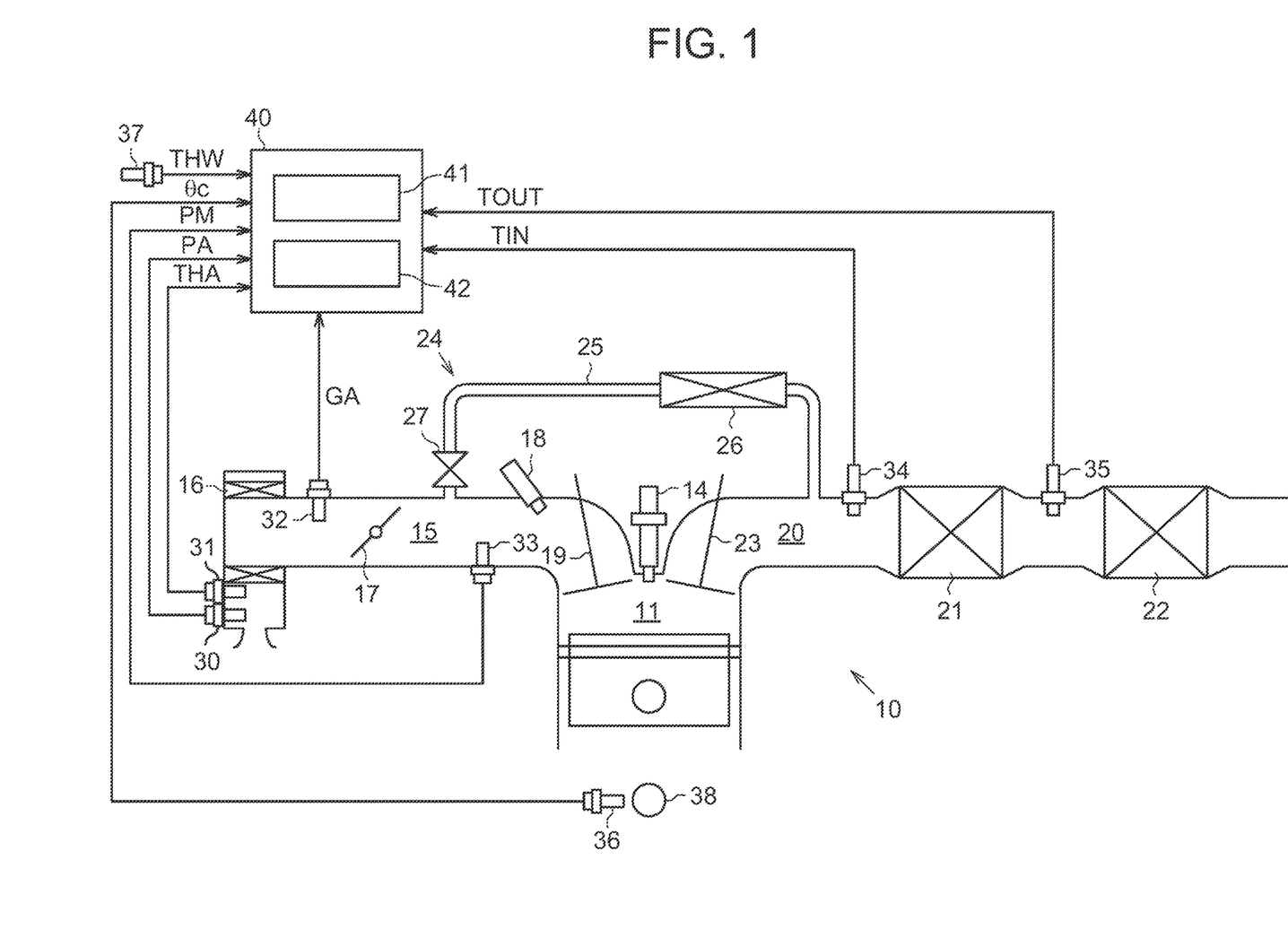
FIG. 1 is a diagram schematically showing the configuration of one embodiment of an engine control device.

First, the configuration of an engine 10 that is an object to be controlled by the engine control device of the embodiment will be described with reference to FIG. 1. As shown in FIG. 1, the engine 10 has an intake air passage 15 that is an introduction passage of intake air into a combustion chamber 11, and an exhaust gas passage 20 that is a discharge passage of exhaust gas from the combustion chamber 11. Inside the combustion chamber 11, an ignition device 14 that ignites an air-fuel mixture of the intake air and fuel by spark discharge is installed.

In the intake air passage 15 of the engine 10, an air cleaner 16, a throttle valve 17, and an injector 18 are provided. The air cleaner 16 is a filter that filters out impurities, such as dust, in the intake air. The throttle valve 17 is a valve that adjusts the flow rate of the intake air flowing through the intake air passage 15. The injector 18 is a fuel injection valve that injects the fuel into the intake air as it passes through the throttle valve 17 and flows into the combustion chamber 11. The intake air passage 15 is connected to the combustion chamber 11 through an intake valve 19. The intake valve 19 is driven to open and close in synchronization with rotation of the engine 10. The intake air passage 15 communicates with the combustion chamber 11 when the intake valve 19 opens, and is cut off from the combustion chamber 11 when the intake valve 19 closes.

In the exhaust gas passage 20 of the engine 10, an exhaust gas cleaning filter 21 and a catalytic device 22 are provided. The exhaust gas cleaning filter 21 is a filter that collects fine particulate matter in the exhaust gas flowing through the exhaust gas passage 20. The catalytic device 22 is installed in the exhaust gas passage 20, at a part on a downstream side of the exhaust gas cleaning filter 21. In the catalytic device 22, a three-way catalyst is supported that oxidizes hydrocarbon (HC) and carbon monoxide (CO) in the exhaust gas and at the same time reduces nitrogen oxide (NOx) in the exhaust gas. The exhaust gas passage 20 is connected to the combustion chamber 11 through an exhaust valve 23. The exhaust valve 23 is driven to open and close in synchronization with rotation of the engine 10. The exhaust gas passage 20 communicates with the combustion chamber 11 when the exhaust valve 23 opens, and is cut off from the combustion chamber 11 when the exhaust valve 23 closes.

The engine 10 further has an exhaust gas recirculation device 24 that recirculates part of the exhaust gas back to the intake air passage 15. The exhaust gas recirculation device 24 includes an EGR passage 25, an EGR cooler 26, and an EGR valve 27. The EGR passage 25 is a pipe that forms a flow passage of the exhaust gas recirculated back to the intake air passage 15, or so-called EGR gas. The EGR passage 25 is provided so as to connect a part of the exhaust gas passage 20 on an upstream side of the exhaust gas cleaning filter 21 and a part of the intake air passage 15 on the downstream side of the throttle valve 17 to each other. The EGR cooler 26 is a cooling device that cools the EGR gas flowing through the EGR passage 25. The EGR valve 27 is a valve that changes the flow passage area of the EGR passage 25 as the valve position is changed, and thereby adjusts an EGR amount that is the flow rate of the EGR gas recirculated back to the intake air passage 15 through the EGR passage 25.

The engine 10 is provided with various sensors for detecting the operation state of the engine 10. These sensors include an atmospheric pressure sensor 30, an outside air temperature sensor 31, an air flow/meter 32, an intake air pressure sensor 33, an incoming gas temperature sensor 34, an outgoing gas temperature sensor 35, a crank angle sensor 36, and a coolant temperature sensor 37. The atmospheric pressure sensor 30 is a sensor that detects an atmospheric pressure PA, and the outside air temperature sensor 31 is a sensor that detects an outside air temperature THA. The air flowmeter 32 is a sensor that detects an intake air flow rate GA at a part of the intake air passage 15, on the upstream side of the throttle valve 17. The intake air pressure sensor 33 is a sensor that detects an intake air pressure PM that is a pressure at a part of the intake air passage 15, on the downstream side of the throttle valve 17. The incoming gas temperature sensor 34 is a sensor that detects an incoming gas temperature TIN that is the temperature of the exhaust gas flowing into the exhaust gas cleaning filter 21. The outgoing gas temperature sensor 35 is a sensor that detects an outgoing gas temperature TOUT that is the temperature of the exhaust gas flowing out of the exhaust gas cleaning filter 21. The crank angle sensor 36 is a sensor that detects a crank angle θc that is the rotation angle of a crankshaft 38 forming an output shaft of the engine 10. The coolant temperature sensor 37 is a sensor that detects a coolant temperature THW in the engine 10.

Configuration of Engine Control Device

The engine 10 configured as has been described above is controlled by an electronic control unit 40 that serves as an engine control device. The electronic control unit 40 is configured as a microcomputer including an arithmetic processing circuit 41 and a memory 42. Detection signals of the aforementioned sensors are input into the electronic control unit 40. The electronic control unit 40 determines operation amounts of the engine 10, including an ignition timing, a throttle position, a fuel injection amount, and an EGR valve position, based on the operation state of the engine 10 grasped from the detection signals of the sensors. Then, the electronic control unit 40 performs engine control by driving the ignition device 14, the throttle valve 17, the injector 18, the EGR valve 27, etc. based on the determined operation amounts.

As part of engine control, the electronic control unit 40 performs fuel cut-off control of stopping fuel injection of the engine 10 during coasting of the vehicle. Further, during operation of the engine 10, the electronic control unit 40 performs a first diagnosis process of diagnosing whether the exhaust gas recirculation device 24 has an abnormality and a second diagnosis process of diagnosing whether the exhaust gas cleaning filter 21 has a fracture.

First Diagnosis Process

First, the first diagnosis process will be described. An abnormality of the exhaust gas recirculation device 24 diagnosed by the first diagnosis process refers to a state where the EGR amount cannot be adjusted due to sticking of the EGR valve 27, clogging of the EGR passage 25, or other causes. The first diagnosis process is executed during fuel cut-off control of the engine 10. In the first diagnosis process, the EGR valve position is changed and whether the exhaust gas recirculation device 24 has an abnormality is diagnosed based on whether the intake air pressure PM changes as a result of the change in the valve position.

Figure 2:
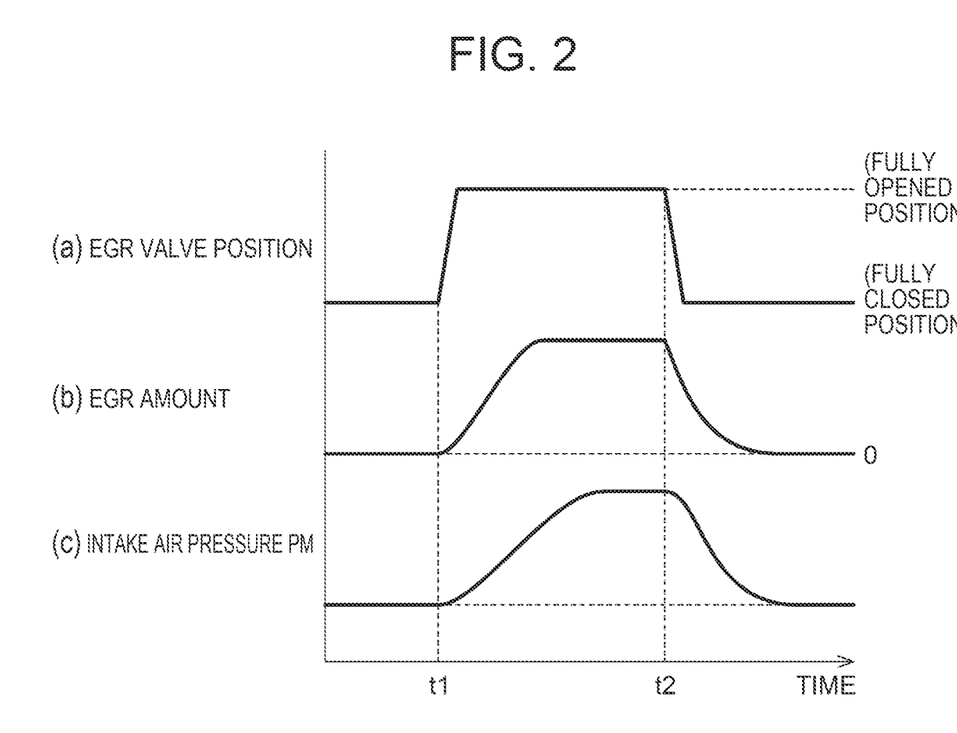
FIG. 2 is time chart showing changes in an EGR valve position, changes in an EGR amount, and changes in an intake air pressure, respectively, during execution of a first diagnosis process by the engine control device.

FIG. 2 shows changes in the following state quantities during execution of the first diagnosis process. A portion (a), a portion (b), and a portion (c) in FIG. 2 show changes in the EGR valve position, changes in the EGR amount, and changes in the intake air pressure PM, respectively. In the portion (b) and the portion (c) in FIG. 2, changes in the EGR valve position and the intake air pressure PM when the exhaust gas recirculation device 24 is functioning, normally are represented by solid lines. In addition, in the portion (b) and the portion (c) in FIG. 2, changes in the EGR valve position and the intake air pressure PM when the exhaust gas recirculation device 24 has the above-described abnormality are represented by broken lines. In the following description, an EGR valve position in which the EGR gas flow passage area becomes zero will be referred to as a "fully closed position," and an EGR valve position in which the EGR gas flow passage area becomes maximum within the range of changing the EGR valve position will be referred to as a "fully opened position."

In FIG. 2, when the first diagnosis process is started at time t1, the EGR valve position is changed from the fully closed position to the fully opened position. After the EGR valve position is kept in the fully opened position until subsequent time t2, the EGR valve position is changed from the fully opened position to the fully closed position. If the exhaust gas recirculation device 24 is functioning normally, the EGR amount increases as the EGR valve position is changed from the fully closed position to the fully opened position. Then, the gas flow rate in the intake air passage 15 increases by an amount corresponding to the EGR gas introduced into the intake air passage 15, so that the intake air pressure PM rises. However, if the exhaust gas recirculation device 24 has an abnormality, the EGR amount changes little even when it is commanded that the EGR valve position be changed from the fully closed position to the fully opened position. In this case, therefore, the intake air pressure PM remains substantially constant even when the EGR valve position is changed.

In the first diagnosis process, the amount of change that the intake air pressure PM undergoes as a result of the change in the EGR valve position from the fully closed position to the fully opened position is measured. When the measured amount of change in the intake air pressure PM exceeds a predetermined abnormality criterion value, it is determined that the exhaust gas recirculation device 24 has no abnormality, and if the amount of change is equal to or smaller than the abnormality criterion value, it is determined that the exhaust gas recirculation device 24 has an abnormality.

Second Diagnosis Process

Next, the second diagnosis process will be described. The exhaust gas cleaning filter 21 is made of a porous material, such as ceramics. When such an exhaust gas cleaning filter 21 fractures due to an outer shock or a thermal shock, fine particulate matter in the exhaust gas leaks into outside air by evading the filter through the fractured portion. In the second diagnosis process, whether the exhaust gas cleaning filter 21 has a fracture is diagnosed based on the incoming gas temperature TIN and the outgoing gas temperature TOUT after the start of fuel cut-off control.

Figure 3:
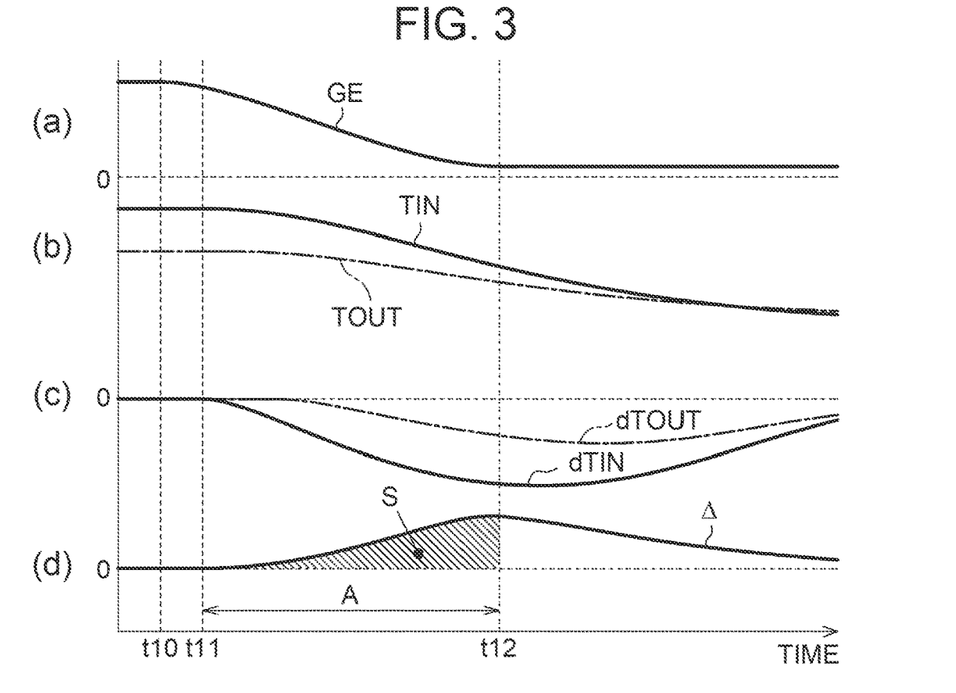
FIG. 3 is time chart showing changes in an exhaust gas flow rate, changes in an incoming gas temperature and an outgoing gas temperature, changes in amounts of change in these gas temperatures, and changes in a difference between these amounts of change, respectively, during execution of a second diagnosis process by the engine control device in a state where an exhaust gas cleaning filter has no fracture.

A portion (a) in FIG. 3 shows changes in the exhaust gas flow rate GE after the start of fuel cut-off control when the exhaust gas cleaning filter 21 has no fracture, and A portion (b) in FIG. 3 shows changes in the incoming gas temperature TIN and the outgoing gas temperature TOUT at that time. When fuel cut-off control is started at time t10 of FIG. 3 and combustion of the air-fuel mixture in the combustion chamber 11 is suspended, fresh air is discharged from the combustion chamber 11 to the exhaust gas passage 20. As the gas flowing through the exhaust gas passage 20 that has been combusted gas is replaced with fresh air, the exhaust gas flow rate GE in the exhaust gas passage 20 decreases. After the start of fuel cut-off control, the gas flowing into the exhaust gas cleaning filter 21 that has been high-temperature combusted gas is also replaced with fresh air. Therefore, the incoming gas temperature TIN starts to decrease from time t11 after the start of fuel cut-off control. As the incoming gas temperature TIN decreases, the outgoing gas temperature TOUT also decreases.

The exhaust gas cleaning filter 21 reaches a high temperature by receiving heat from the exhaust gas during combustion of the engine 10. This temperature of the exhaust gas cleaning filter 21 does not decrease immediately after the start of fuel cut-off control. Therefore, for a while after the start of fuel cut-off control, the temperature of the exhaust gas cleaning filter 21 remains higher than the incoming gas temperature TIN. The exhaust gas passing through the exhaust gas cleaning filter 21 in this state receives heat from the exhaust gas cleaning filter 21. As a result, after the start of fuel cut-off control, the outgoing gas temperature TOUT decreases with a delay after the inflow gas temperature TIN decreases.

Figure 4:
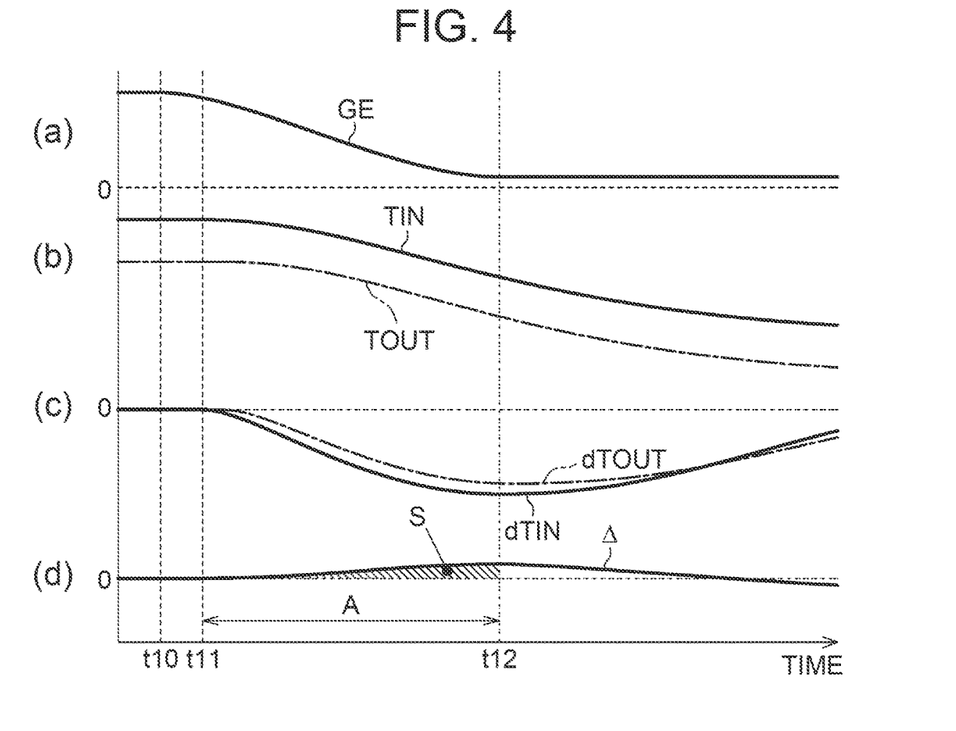
FIG. 4 is time chart showing changes in the exhaust gas flow rate, changes in the incoming gas temperature and the outgoing gas temperature, changes in the amounts of change in these gas temperatures, and changes in the difference between these amounts of change, respectively, during execution of the second diagnosis process by the engine control device in a state where the exhaust gas cleaning filter has a fracture.

A portion (a) in FIG. 4 shows changes in the exhaust gas flow rate GE after the start of fuel cut-off control when the exhaust gas cleaning filter 21 has a fracture, and a portion (b) in FIG. 4 shows changes in the incoming gas temperature TIN and the outgoing gas temperature TOUT at that time. When the exhaust gas cleaning filter 21 has a fracture, part of the exhaust gas passes through the fractured portion without being filtered by the exhaust gas cleaning filter 21. Thus, in this case, the exhaust gas receives a smaller amount of heat while passing through the exhaust gas cleaning filter 21 than when the exhaust gas cleaning filter 21 has no fracture. Therefore, when the exhaust gas cleaning filter 21 has a fracture, compared with when it has no fracture, after the start of fuel cut-off control, the outgoing gas temperature TOUT decreases with a shorter delay after the incoming gas temperature TIN decreases.

Here, heat exchange between the exhaust gas cleaning filter 21 and the exhaust gas in the course of the incoming gas temperature TIN decreasing after the start of fuel cut-off control will be considered. In the following description, with an "incoming gas heat amount" defined as the amount of heat that the exhaust gas flowing into the exhaust gas cleaning filter 21 has, the amount of change per unit time in this incoming gas heat amount will be referred to as an "incoming gas heat amount change dQIN." Further, with an "outcoming gas heat amount" defined as the amount of heat that the exhaust gas flowing out of the exhaust gas cleaning filter 21 has, the amount of change per unit time in this outgoing gas heat amount will be referred to as an "outgoing gas heat amount change dQOUT." In addition, the amount of heat per unit time that the exhaust gas receives from the exhaust gas cleaning filter 21 will be referred to as a "received heat amount dQF." The received heat amount dQF is obtained as a difference resulting from subtracting the incoming gas heat amount change dQIN from the outgoing gas heat amount change dQOUT (dQF=dQOUT−dQIN). The incoming gas heat amount change dQIN is obtained as the product of the exhaust gas flow rate GE, an incoming gas temperature change dTIN, and a specific heat C of the exhaust gas (dQIN=GE×dTIN×C). The outgoing gas heat amount change dQOUT is obtained as the product of the exhaust gas flow rate GE, an outgoing gas temperature change dTOUT, and the specific heat C of the exhaust gas (dQOUT=GE×dTOUT×C). Therefore, the received heat amount dQF has a value proportional to the difference resulting from subtracting the incoming gas temperature change dTIN from the outgoing gas temperature change dTOUT. In the following description, the difference resulting from subtracting the incoming gas temperature change dTIN from the outgoing gas temperature change dTOUT will be referred to as a "change amount difference Δ."

A portion (c) in FIG. 3 shows changes in the incoming gas temperature change dTIN and the outgoing gas temperature change dTOUT when the exhaust gas cleaning filter 21 has no fracture, and a portion (d) in FIG. 3 shows changes in the change amount difference Δ in this case. On the other hand, a portion (c) in FIG. 4 shows changes in the incoming gas temperature change dTIN and the outgoing gas temperature change dTOUT when the exhaust gas cleaning filter 21 has a fracture, and a portion (d) in FIG. 4 shows changes in the change amount difference Δ in this case. Time t12 shown in FIG. 3 and FIG. 4 represents a point in time when a predetermined diagnosis time A has passed since time t11 at which the incoming gas temperature TIN starts to decrease.

In the second diagnosis process, the electronic control unit 40 reads detected values of the incoming gas temperature TIN and the outgoing gas temperature TOUT on a predetermined sampling cycle during a period from time t11 to time t12, and calculates the change amount difference Δ from these values. Then, the electronic control unit 40 obtains an integrated value S of the change amount difference Δ over the period from time t11 to time t12. The value of the integrated value S corresponds to the area of the hatched parts in the portion (d) in FIG. 3 and the portion (d) in FIG. 4. The value of the integrated value S is a value proportional to the total amount of heat that the exhaust gas has received from the exhaust gas cleaning filter 21 during the aforementioned period.

In the embodiment, whether the exhaust gas cleaning filter 21 has a fracture is diagnosed based on whether this integrated value S is large or small. Specifically, when the integrated value S is equal to or smaller than a predetermined fracture criterion value, the electronic control unit 40 determines that the exhaust gas cleaning filter 21 has a fracture, and when the integrated value S exceeds the fracture criterion value, the electronic control unit 40 determines that the filter 21 has no fracture.

Execution of Diagnoses

Figure 5:
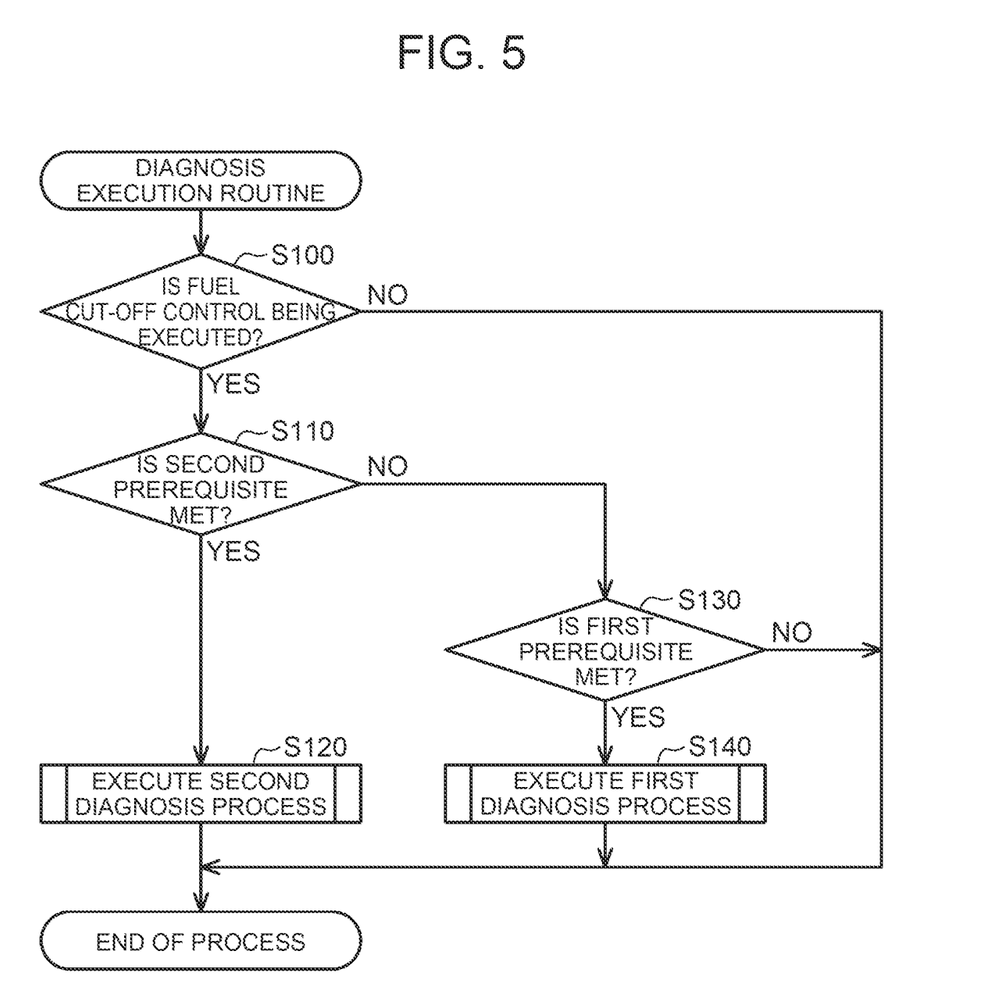
FIG. 5 is a flowchart of a diagnosis execution routine executed by the engine control device.

Next, an aspect of execution of the first diagnosis process and the second diagnosis process in the embodiment will be described with reference also to FIG. 5. FIG. 5 is a flowchart of a diagnosis execution routine involved in execution of the first diagnosis process and the second diagnosis process. During a trip of the vehicle, the electronic control unit 40 repeatedly executes processing of this routine on a predetermined control cycle.

When this routine is started, first, it is determined in step S100 whether fuel cut-off control is being executed. When fuel cut-off control is being executed (YES), the processing moves to step S110, and when fuel cut-off control is not being executed (NO), the current processing of the routine ends directly.

When the processing moves to step S110, it is determined in step S110 whether a second prerequisite that is a prerequisite for the second diagnosis process is met. The second prerequisite is met when all of the following requirements (a) to (g) are satisfied. When the second prerequisite is met (YES), the processing moves to step S120. In step S120, the second diagnosis process is executed, and then the current processing of the routine ends.

(a) The coolant temperature THW in the engine 10 is not lower than a predetermined warming-up criterion value. A lower limit value in a range of the coolant temperature THW upon completion of warming-up of the engine 10 is set as the warming-up criterion value.

(b) The atmospheric pressure PA exceeds a predetermined high-altitude criterion value. A pressure lower than a standard atmospheric pressure (1013.25 [hPa]) is set as the high-altitude criterion value.

(c) The outside air temperature THA is not lower than a predetermined low-air-temperature criterion value.

(d) The voltage of an on-board auxiliary battery is not lower than a predetermined value. In other words, the supply of electricity to the electronic control unit 40, the sensors, etc. is stable.

(e) The incoming gas temperature TIN at the start of the current fuel cut-off control has been not lower than a predetermined high-temperature criterion value.

(f) The incoming gas temperature TIN has been higher than the outgoing gas temperature TOUT at the start of the current fuel cut-off control.

(g) The second diagnosis process has not yet been completed in the current trip. In this embodiment, the second diagnosis process is executed only once per trip.

When the second prerequisite is met and the processing moves to step S120, the second diagnosis process is executed in step S120.

Meanwhile, when it is determined in step S110 that the second prerequisite is not met (NO), the processing moves to step S130. It is determined in step S130 whether a first prerequisite that is a prerequisite for the first diagnosis process is met. The first prerequisite is met when all of the above requirements (a) to (d) and the following requirement (h) are satisfied. When the first prerequisite is not met (NO), the current processing of the routine ends directly. On the other hand, when the first prerequisite is met (YES), the processing moves to step S140. In step S140, the first diagnosis process is executed, and then the current processing of the routine ends.

(h) The first diagnosis process has not yet been completed in the current trip. In this embodiment, the first diagnosis process is also executed only once per trip.

Workings and Effects of Embodiment

The workings and effects of the embodiment will be described.

In the embodiment, the first diagnosis process for diagnosing whether the exhaust gas recirculation device 24 has an abnormality and the second diagnosis process for determining whether the exhaust gas cleaning filter 21 has a fracture are executed during fuel cut-off control. If these first diagnosis process and second diagnosis process are executed at the same time, the diagnostic accuracy of the second diagnosis process may decrease.

The reason is as follows: In the first diagnosis process, during fuel cut-off control, the EGR valve position is changed and whether the exhaust gas recirculation device 24 has an abnormality is diagnosed based on the amount of change that the intake air pressures PM undergoes as a result of the change. In the second diagnosis process, whether the exhaust gas cleaning filter 21 has a fracture is diagnosed based on measured values of the incoming gas temperature TIN and the outgoing gas temperature TOUT during fuel cut-off control. In the embodiment, the accuracy of diagnosing whether the exhaust gas cleaning filter 21 has a fracture is increased by executing the second diagnosis process during a period immediately after the start of fuel cut-off control when the state quantity of the exhaust gas flowing into the exhaust gas cleaning filter 21 changes monotonously. If the first diagnosis process is executed and the EGR valve position is changed during execution of the second diagnosis process, the flow rate of the exhaust gas flowing into the exhaust gas cleaning filter 21 fluctuates. Therefore, if the first diagnosis process and the second diagnosis process are executed at the same time, the diagnostic accuracy of the second diagnosis process may decrease.

From this perspective, in the embodiment, the second diagnosis process is executed when the second prerequisite is met during execution of fuel cut-off control. Thus, in the embodiment, a second diagnosis execution condition that is a condition for executing the second diagnosis process is that the fuel cut-off control is being executed and that, moreover, the second prerequisite is met. On the other hand, the first diagnosis process is executed when the first prerequisite is met during fuel cut-off control. Thus, in the embodiment, a first diagnosis execution condition that is a condition for executing the first diagnosis process is that fuel cut-off control is being executed and that, moreover, the first prerequisite is met.

In the above-described diagnosis execution routine, whether the second diagnosis execution condition is met is determined before whether the first diagnosis execution condition is met. When the second diagnosis execution condition is met, the second diagnosis process is executed without determining whether the first diagnosis execution condition is met. This means that even when, in reality, the first diagnosis execution condition is met, if the second diagnosis execution condition is met, the first diagnosis process is not executed and only the second diagnosis process is executed. Thus, in the embodiment, the second diagnosis process is executed when the second diagnosis execution condition is met, and the first diagnosis process is not executed when the second diagnosis process is being executed. In other words, in the embodiment, the second diagnosis process is executed when the second diagnosis execution condition is met and, moreover, the first diagnosis process is not being executed. As such, in the embodiment, the first diagnosis process and the second diagnosis process are not executed at the same time. Therefore, the EGR valve position is not changed in the first diagnosis process during execution of the second diagnosis process.

In the embodiment as has been described, when both the first diagnosis execution condition and the second diagnosis execution condition are met, execution of the first diagnosis process is deferred and the second diagnosis process is executed. When the second diagnosis process is completed, the requirement (g) of the second prerequisite is no longer satisfied, so that the second diagnosis execution condition is no longer met. In this case, therefore, the first diagnosis process is executed when the first diagnosis execution condition is met after completion of the second diagnosis process.

The engine control device of the embodiment as has been described above can produce the following effects:

(1) In the embodiment, the first diagnosis process of changing the EGR valve position and diagnosing whether the exhaust gas recirculation device 24 has an abnormality based on measured values of the intake air pressure PM before and after the change in the valve position is executed upon the predetermined first diagnosis execution condition being met. Further, the second diagnosis process of diagnosing whether the exhaust gas cleaning filter 21 has an abnormality based on a measured value of the incoming gas temperature TIN that is the temperature of the exhaust gas flowing into the exhaust gas cleaning filter 21 and a measured value of the outgoing gas temperature TOUT that is the temperature of the exhaust gas flowing out of the exhaust gas cleaning filter 21 is executed when the predetermined second diagnosis execution condition is met and, moreover, the first diagnosis process is not being executed. Thus, the EGR valve position is not changed in the first diagnosis process during execution of the second diagnosis process. This can prevent a situation where the accuracy of diagnosing whether the exhaust gas cleaning filter 21 has a fracture decreases as the EGR valve position is changed during the diagnosis.

(2) The second diagnosis process in the embodiment is based on the assumption that when the exhaust gas cleaning filter 21 has no fracture, after the start of fuel cut-off control, the outgoing gas temperature TOUT decreases with a delay after the incoming gas temperature TIN decreases, due to heat transferred from the exhaust gas cleaning filter 21 to the exhaust gas. When the incoming gas temperature TIN at the start of fuel cut-off control is low and the temperature of the exhaust gas cleaning filter 21 is also low, the amount of heat transferred from the exhaust gas cleaning filter 21 to the exhaust gas becomes smaller, which makes it difficult to secure the diagnostic accuracy of the second diagnosis process. Further, when the temperature of the exhaust gas cleaning filter 21 at the start of fuel cut-off is significantly higher than the incoming gas temperature TIN at that time, even when the incoming gas temperature TIN decreases after the start of fuel cut-off control, the outgoing gas temperature TOUT may not decrease much. Also in this case, it is difficult to secure the diagnostic accuracy of the second diagnosis process. In the embodiment, therefore, meeting the second prerequisite that is a prerequisite for executing the second diagnosis process requires satisfying the above requirements (e) and (f). On the other hand, the diagnosis of whether the exhaust gas recirculation device 24 has an abnormality in the first diagnosis process can be accurately performed even when these requirements (e) and (f) are not satisfied. Thus, opportunities to execute the first diagnosis process are more likely to arise than those to execute the second diagnosis process. From this perspective, in the embodiment, when both the first diagnosis execution condition and the second diagnosis execution condition are met, execution of the first diagnosis process is deferred and the second diagnosis process is executed. The first diagnosis process is executed after the second diagnosis process ends. Thus, in the embodiment, when an opportunity to execute the first diagnosis process and that to execute the second diagnosis process arise at the same time, the second diagnosis process is executed in preference to the first diagnosis process. As a result, opportunities to execute the second diagnosis process are more likely to arise.

(3) Most of engines equipped with the exhaust gas cleaning filter 21 and the catalytic device 22 provided downstream thereof are provided with the incoming gas temperature sensor 34 that detects the incoming gas temperature TIN and the outgoing gas temperature sensor 35 that detects the outgoing gas temperature TOUT to check activation states of the exhaust gas cleaning filter 21 and the catalytic device 22. From this perspective, in the embodiment, the diagnosis of whether the exhaust gas cleaning filter 21 has a fracture in the second diagnosis process is performed based on the integrated value S of the change amount difference Δ that is the difference between the incoming gas temperature change dTIN and the outgoing gas temperature change dTOUT. Therefore, in engines in which the incoming gas temperature sensor 34 and the outgoing gas temperature sensor 35 are originally installed, whether the exhaust gas cleaning filter 21 has a fracture can be diagnosed without requiring new sensors to be added.

The embodiment can be implemented with the following changes made thereto. The embodiment and the following modified examples can be implemented in combinations within such a range that no technical inconsistency arises.

In the above embodiment, the diagnosis of whether the exhaust gas cleaning filter 21 has a fracture in the second diagnosis process is performed based on the integrated amount S of the change amount difference Δ that is the difference between the incoming gas temperature change dTIN and the outgoing gas temperature change dTOUT. The period over which the change amount difference Δ is integrated to calculate the integrated value S is set to be a period that starts when the incoming gas temperature TIN starts to decrease after the start of fuel cut-off control and ends when the predetermined diagnosis time A has elapsed since the start. This period over which the change amount difference Δ is integrated in the second diagnosis process may be changed as necessary. For example, the period of integration may be set such that integration of the change amount difference Δ is started when fuel cut-off control starts, or that integration of the change amount difference Δ ends when the amount of decrease in the incoming gas temperature TIN after the start of fuel cut-off control reaches a certain amount.

In the above embodiment, the diagnosis of whether the exhaust gas cleaning filter 21 has a fracture in the second diagnosis process is performed based on the integrated value S of the change amount difference Δ that is the difference between the incoming gas temperature change dTIN and the outgoing gas temperature change dTOUT. If a time at which there is a clear distinction in an instantaneous value of the change amount difference Δ between when the exhaust gas cleaning filter 21 has a fracture and when it has no fracture can be determined, the diagnosis of whether the exhaust gas cleaning filter 21 has a fracture in the second diagnosis process may be performed based on the instantaneous value of the change amount difference Δ at that time.

The diagnosis of whether the exhaust gas cleaning filter 21 has a fracture in the second diagnosis process may be performed based on the difference between the incoming gas temperature TIN and the outgoing gas temperature TOUT. For example, if there is a great distinction between when the exhaust gas cleaning filter 21 has a fracture and when it has no fracture, there may be a distinction in the difference between the incoming gas temperature TIN and the outgoing gas temperature TOUT at the time when the decrease in the incoming gas temperature TIN after the start of fuel cut-off control has leveled off to some extent. In such a case, whether the exhaust gas cleaning filter 21 has a fracture can be diagnosed based on the difference between the incoming gas temperature TIN and the outgoing gas temperature TOUT at that time.

In the above embodiment, the diagnosis of whether the exhaust gas cleaning filter 21 has a fracture in the second diagnosis process is performed based on measured values of the incoming gas temperature TIN and the outgoing gas temperature TOUT. This diagnosis of whether the exhaust gas cleaning filter 21 has a fracture in the second diagnosis process may be performed based on a measured value of the pressure of the exhaust gas flowing into the exhaust gas cleaning filter 21 and a measured value of the pressure of the exhaust gas flowing out of the exhaust gas cleaning filter 21. When the exhaust gas cleaning filter 21 has a fracture, compared with when it has no fracture, the difference in the pressure between the exhaust gas flowing into the exhaust gas cleaning filter 21 and the exhaust gas flowing out of the exhaust gas cleaning filter 21 becomes smaller. Therefore, when the engine is provided with a sensor that measures the difference in the pressure between the incoming exhaust gas and the outgoing exhaust gas, whether the exhaust gas cleaning filter 21 has a fracture can be diagnosed based on the difference in the pressure between these exhaust gases.

In the above embodiment, the diagnosis of whether the exhaust gas recirculation device 24 has an abnormality in the first diagnosis process is performed based on the amount of change in the intake air pressure PM resulting from a change in the EGR valve position. When the amount of recirculating exhaust gas changes due to a change in the EGR valve position, the intake air flow rate GA also changes. Therefore, the diagnosis of whether the exhaust gas recirculation device 24 has an abnormality in the first diagnosis process can also be performed based on the amount of change in the intake air pressure PM resulting from a change in the EGR valve position.

In the above embodiment, the first diagnosis process and the second diagnosis process are performed during execution of fuel cut-off control under which the states of the intake air and the exhaust gas in the engine 10 are stable. In an engine mounted in a hybrid electric vehicle, a state similar to that under fuel cut-off control can be created in the following manner. In a hybrid electric vehicle, a generator-motor is coupled to an engine so as to drive the engine, so that even when fuel injection of the engine is suspended, rotation of the engine can be maintained using the power of the generator-motor. Thus, the engine in this case is in a state where combustion has stopped and, moreover, rotation thereof is maintained, as under fuel cut-off control. Meanwhile, in a hybrid electric vehicle, the engine is intermittently operated according to the travel situation. Therefore, when the first diagnosis execution condition or the second diagnosis execution condition is met in a state where operation of the engine can be suspended, the first diagnosis process or the second diagnosis process is executed with fuel injection of the engine suspended and the engine rotated by the power of the generator-motor. Also in this case, the first diagnosis process and the second diagnosis process are performed in a state where the intake air and the exhaust gas are stable. Therefore, the first diagnosis process and the second diagnosis process can be accurately performed. Also in this case, executing the second diagnosis process when the second diagnosis execution condition is met and, moreover, the first diagnosis process is not being executed can prevent the situation where the diagnostic accuracy of the second diagnosis process decreases due to the influence of the EGR valve position being changed in the first diagnosis process.

In the above embodiment, when both the first diagnosis execution condition and the second diagnosis execution condition are met, execution of the first diagnosis process is deferred and the second diagnosis process is executed. Then, the first diagnosis process is executed when the first diagnosis execution condition is met after completion of the second diagnosis process. Depending on the settings of the first diagnosis execution condition and the second diagnosis execution condition, it is possible that the second diagnosis execution condition may be met while the first diagnosis execution condition is not met. In such a case, the second diagnosis process is executed, and the first diagnosis execution condition may be met during execution of the second diagnosis process. In this case, the second diagnosis process may be interrupted and the first diagnosis process may be executed. Then, if the second diagnosis execution condition is still met after completion of the first diagnosis process, the second diagnosis process is resumed. Also in such a case, the second diagnosis process is executed when the first diagnosis process is not being executed. This can prevent the situation where the diagnostic accuracy of the second diagnosis process decreases as the EGR valve position is changed in the first diagnosis process. Conversely, when the second diagnosis execution condition is met while the first diagnosis process is being executed, the first diagnosis process may be interrupted and the second diagnosis process may be executed.

In the above embodiment, the first diagnosis process and the second diagnosis process are executed when the engine has stopped combustion and, moreover, rotation of the engine is maintained. Even during combustion operation of the engine, there are times like during idling operation, for example, when the states of the intake air and the exhaust gas are stable. The first diagnosis process and the second diagnosis process may be performed when the states of the intake air and the exhaust gas are stable at such times during combustion operation.

In the above embodiment, when both the first diagnosis execution condition and the second diagnosis execution condition are met, execution of the first diagnosis process is deferred and the second diagnosis process is executed. In such a case, execution of the second diagnosis process may be deferred and the first diagnosis process may be executed. Also in this case, the situation can be prevented where the diagnostic accuracy of the second diagnosis process decreases as the EGR valve position is changed in the first diagnosis process during execution of the second diagnosis process.

The requirements for meeting the first diagnosis execution condition may include that the second diagnosis process has been completed. The requirements for meeting the second diagnosis execution condition may include that the first diagnosis process has been completed. Also in this case, the second diagnosis process is executed when the second diagnosis execution condition is met and, moreover, the first diagnosis process is not being executed.

In the above embodiment, the first diagnosis process and the second diagnosis process are not executed at the same time. By taking one step further, the first diagnosis process and the second diagnosis process may be executed during separate rounds of fuel cut-off control. That is, until fuel cut-off control under which one of the first diagnosis process and the second diagnosis process is executed ends, execution of the other one of the diagnosis processes is deferred. Then, the other diagnosis process is executed when the prerequisite for that process is met during execution of the next or a later round of fuel cut-off control.

What is claimed is:

1. An engine control device applied to an engine including an exhaust gas cleaning filter that is provided in an exhaust gas passage and an exhaust gas recirculation device that recirculates part of exhaust gas flowing through the exhaust gas passage back to an intake air passage, wherein:
the exhaust gas recirculation device includes an exhaust gas recirculation passage that is a passage for the exhaust gas recirculated back to the intake air passage, and an exhaust gas recirculation valve that changes an exhaust gas flow passage area of the exhaust gas recirculation passage as a position of the valve is changed;
upon a predetermined first diagnosis execution condition being met, the engine control device executes a first diagnosis process of changing the position of the exhaust gas recirculation valve and diagnosing whether the exhaust gas recirculation device has an abnormality based on a measured value of a state quantity of intake air before the change in the valve position and a measured value of the state quantity of the intake air after the change in the valve position;
upon a predetermined second diagnosis execution condition being met, the engine control device executes a second diagnosis process of diagnosing whether the exhaust gas cleaning filter has a fracture based on a measured value of a state quantity of exhaust gas flowing into the exhaust gas cleaning filter and a measured value of the state quantity of exhaust gas flowing out of the exhaust gas cleaning filter;

the engine control device does not execute the first diagnosis process and the second diagnosis process at the same time;

when both the first diagnosis execution condition and the second diagnosis execution condition are met, the engine control device defers execution of the first diagnosis process and executes the second diagnosis process; and for each of the first diagnosis execution condition and the second diagnosis execution condition, meeting the condition requires that the engine has stopped combustion and that, moreover, rotation of the engine is maintained.

2. The engine control device according to claim 1, wherein, when execution of the first diagnosis process is deferred and the second diagnosis process is executed, the first diagnosis process is executed after the second diagnosis process ends.

3. The engine control device according to claim 1, wherein a temperature of the exhaust gas is used as the state quantity of the exhaust gas.

4. The engine control device according to claim 3, wherein the second diagnosis process diagnoses whether the exhaust gas cleaning filter has a fracture based on a difference between an amount of change in the temperature of the exhaust gas flowing into the exhaust gas cleaning filter and an amount of change in the temperature of the exhaust gas flowing out of the exhaust gas cleaning filter.

* * * * *